July 22, 1958     R. E. WITTIG     2,844,010

FINGER RING SET WITH MAGNETIC SELF-ALIGNING MEANS

Filed April 23, 1956

INVENTOR.
RICHARD E. WITTIG
BY Williamson, Schroeder,
Adams & Meyers
ATTORNEYS

United States Patent Office 2,844,010
Patented July 22, 1958

2,844,010

FINGER RING SET WITH MAGNETIC SELF-ALIGNING MEANS

Richard E. Wittig, Minneapolis, Minn.

Application April 23, 1956, Serial No. 579,892

3 Claims. (Cl. 63—15.3)

This invention relates to finger rings and more particularly to finger ring sets such as pairs of engagement and wedding rings.

Because of the shape and construction of human fingers, rings placed thereon will turn easily and must be returned to upright position with the mounting facing outwardly whenever so turned. Where a pair of rings are employed such as an engagement and wedding ring, the problem is greater because the rings may not only turn but are misaligned with respect to one another. Obviously the esthetic appearance of the rings is greatly lessened when they are so misaligned. It has been found that such expedients as constructing a ring with a slightly oval or out-of-round periphery will tend to keep the ring in proper position but does not fully answer the problem, particularly as relates to maintaining a pair of rings in alignment with each other. A solution to the problem of misalignment has been proposed wherein a rigid interlocking key of various forms may be mounted on one ring so as to engage a corresponding fastener in the other ring. Such expedient is expensive and delicate and proves to be cumbersome when it is desired to separate the rings to clean them.

It is an object of the present invention to provide a simple finger ring set of rugged construction and conventional appearance wherein a plurality of rings will be kept in alignment without physical and rigid keying together of any portion of the rings.

Another object of the invention is to provide a pair of finger rings wherein normally contacting portions of the rings are constructed of oppositely polarized magnetic material so as to keep the rings in contact and also to urge them into proper alignment should they become misaligned.

A further object of the invention is to provide a specially magnetized ring set wherein mating magnetic portions in the respective rings are designed so as to preserve the conventional pleasing appearance of pairs of rings such as engagement and wedding ring sets, the entire ring bands and mountings being constructed of precious metal alloy.

These and other objects and advantages of my invention will more fully appear from the following description, made in connection with the accompanying drawing, wherein like reference characters refer to the same parts throughout the several views and in which.

Figure 1:
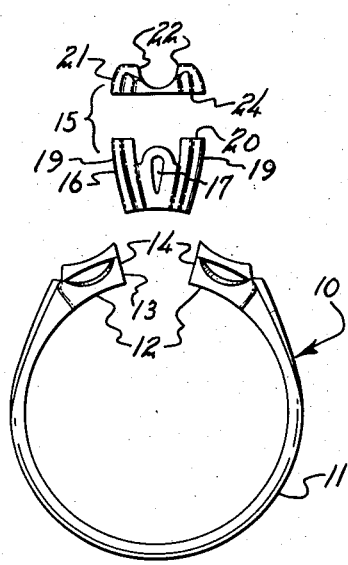
Figure 1 is a side elevation of one of my specially constructed rings, the separate portions thereof being shown in exploded form and with gems omitted.

With continued reference to the drawing, a finger ring 10 commonly identified as an engagement ring is shown in Figure 1. The band portion 11 may be of conventional construction such as platinum, yellow gold or white gold and terminates in a shank 12, which in the instant case is a divided portion secured to band 11 and defining a gap 13 at the divided area. The shank portions 12 are generally of a somewhat thickened construction and may be formed integrally with the remainder of the band 11 and of either the same or other metallic material. The shank portions 12 may be provided with soldering faces 14 of such angulation and spacing as will accommodate the mount, enlarged details of which are shown in Figure 3.

Figure 3:
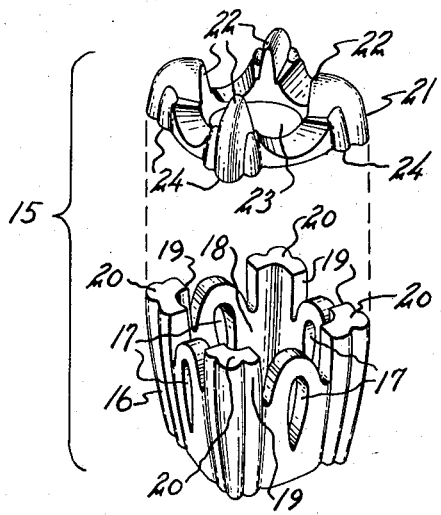
Figure 3 is an enlarged detail in perspective of the magnetic base or insert portion of the ring illustrated in Figure 1, the cap or top portion being separate therefrom.

Mount or head 15, in turn, comprises a base or insert portion 16 which may have open areas 17 to permit light to enter space 18 and conventionally may be provided with corner members 19 terminating in contact areas 20 as shown in detail in Figure 3. The top 21 when utilized as a setting for a gem (not shown) is provided with deformable setting prongs 22 capable of being crimped against the edges of a stone and having an opening 23 medially thereof to permit light to enter from the openings 17 and space 18 in the base or insert portion 16 when combined therewith. The top 21 has corresponding areas 24 for securing as by soldering to the areas 20 of the base 16.

When the engagement ring of Figure 1 is assembled, the top 21 is secured to base or insert portion 16 and the base or insert 16 is, in turn, secured as by soldering across the shank portions 12 to complete the setting. The band 11 is usually constructed of a precious metal alloy having characteristics which will render it capable of being shortened or lengthened by fusing in or removing inserts of the same material. The shank portions 12 may be of the same material or may be of alloy capable of being magnetized to carry out the function disclosed in this specification. The top should be capable of working or forming so as to carry out the crimping of a gem by means of the prongs 22. The base or insert portion 16 may be constructed of magnetizable metal alloy which will function together with or independently of the shank portions to achieve the magnetic function hereinafter discussed in detail. If either or both the shank and the insert is constructed of magnetic material, the polarity of these members is so selected as to lie transversely to the general plane of the ring.

I have found that a useful magnetic alloy for my purpose constitutes a platinum cobalt material of 23% cobalt and 77% platinum. This alloy has a melting point of 1485 degrees centigrate, a density of 15.5 grams per cc. and a hardness of 26 Rockwell C. This particular alloy is a precious metal material and adapts itself to soldering. In addition, the alloy can be melted and cast. It is, however, quite hard and, hence, does not readily adapt itself to portions of a ring which are intended to be worked or altered.

Figure 2:
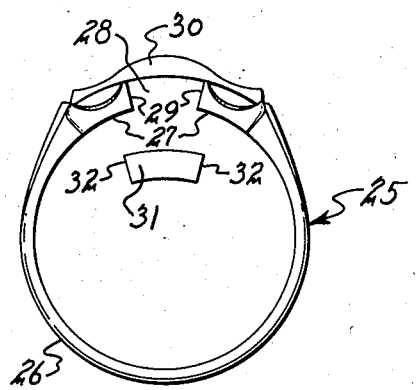
Figure 2 is a side elevation of another ring made in accordance with my invention with the base or insert detached therefrom prior to assembly.

Referring now to Figure 2, the ring there shown is indicated generally at 25 and, in the form shown, is of the type generally utilized as wedding rings. Ring 25 has a band 26 which is generally similar to the band 11 of the engagement ring 10. The shank 27 of the ring 25 may be of the same or dissimilar metal to that of the band 26. In the form of ring indicated at 25, a gap 28 is formed between the shank portions 27 and areas 29 on the shank 27 are formed for the purpose of soldering in the same manner as the surfaces 14 on the form of ring indicated at 10. The top 30 of ring 25 is ornamental in character and spans the shank portions 27, as shown in Figure 2.

A base or insert 31 is adapted to be positioned across the ring at the shank portion 27 and is provided with corresponding soldering areas 32 which will lie against the areas 29. The base or insert 31 may be somewhat wedge-shaped so as to assist in maintaining its position across the shank during and after soldering.

Figure 4:
Figure 4 is an enlarged perspective view of the magnetic base or insert utilized in the ring form shown in Figure 2.

In the case of the ring 25 either or both of the insert and shank members may be constructed of magnetizable alloy and may be so magnetized as to have polarity transverse to the general plane of the ring. In order to maintain a total precious metal alloy content, the magnetic portion of ring 25 may be constructed of the same magnetic alloy mentioned above and utilized in connection with the engagement ring 10. The insert 31 is shown in enlarged detail in Figure 4 and may be cast or otherwise formed to fit the gap or space 28.

Figure 5:
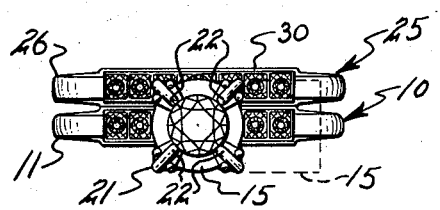
Figure 5 shows the ring set or combination comprising the completed rings of Figures 1 and 2 in juxtaposed and aligned relation, the dotted outline signifying misaligned position of one ring with respect to the other.

The rings 10 and 25 are intended to be used in combination and, hence, the corresponding magnetized areas should be concentrated and of opposed polarity so that the rings, when juxtaposed on a finger, will lie in the relationship shown in Figure 5. Since the opposite poles of the respective magnetic portions of the rings will cause the rings to remain in contact, there will be no tendency to separate while they are worn. At the same time, the rings may be easily separated by forcing them apart and no particular technique is required for removing the rings and cleaning them in the ordinary manner.

In addition to the holding or contacting effect of the ring set, the concentrated and opposed polarity of the respective rings will tend to cause the rings to be self-aligned whenever moved out of position. Thus, if ring 10 has its mount 15 in the dotted line position of Figure 5 while worn in combination with ring 25, the corresponding magnetized areas will tend to work the rings back into alignment while in contact until the rings are properly aligned.

It may thus be seen that I have devised a ring set or combination comprising two rings, each of conventional appearance which, through special magnetic alloy construction, will maintain themselves not only in contact when worn, but also will align themselves in proper relation and tend to maintain that alignment. I have demonstrated how the foregoing can be accomplished while maintaining precious metal construction throughout each of the rings.

It will, of course, be understood that various changes may be made in the form, details, arrangement and proportions of the parts without departing from the scope of my invention.

What I claim is:

1. A finger ring set comprising two rings of substantially the same interior diameter, each of said rings embodying an ornamental head portion, said head portions having side faces adapted to be positioned in juxtaposed contacting relation on a finger, each head portion having a small strongly magnetized area having the polarity lying transversely to the general plane of the ring, the head portions when in said juxtaposed contacting relation having the magnetic poles of opposite sign together and holding the rings together and axially aligned solely by magnetic force, and said magnetized areas acting, when said head portions become shifted to a misaligned relationship which one another within the range of the magnetic fields of the said magnetized areas, to urge relative axial turning of the rings on the finger to bring the head portions back to properly aligned relationship, the said contacting side faces being smooth to permit sliding movement of one against the other in said axial turning.

2. The invention according to claim 1, wherein at least one of said magnetized areas is confined to an insert member forming a part of said head.

3. The invention according to claim 1, wherein each of said heads embodies an insert member of a precious metal alloy in which said magnetized area is located.

References Cited in the file of this patent

UNITED STATES PATENTS

| | | |
|---|---|---|
| 2,059,228 | Granat | Nov. 3, 1936 |
| 2,319,292 | Boggs | May 18, 1943 |
| 2,397,931 | Ellis | Apr. 9, 1946 |